United States Patent [19]
Depot

[11] Patent Number: 5,857,602
[45] Date of Patent: Jan. 12, 1999

[54] BICYCLE/SKI CARRIER

[75] Inventor: Germain Depot, St-Denis de Brompton, Canada

[73] Assignee: Transfo-Rakzs Inc., Bromptonville, Canada

[21] Appl. No.: 904,870

[22] Filed: Aug. 1, 1997

[51] Int. Cl.$^6$ .................. B60R 9/06; B60R 9/10
[52] U.S. Cl. ............... 224/520; 224/532; 224/537; 224/924; 224/917.5; 403/322.4
[58] Field of Search .................. 224/924, 519, 224/520, 531, 532, 536, 917.5; 403/322.4, 322.7, 323

[56] References Cited

U.S. PATENT DOCUMENTS

| | | |
|---|---|---|
| 3,796,333 | 3/1974 | Goldstein . |
| 4,381,069 | 4/1983 | Kreck . |
| 4,400,129 | 8/1983 | Eisenberg et al. . |
| 4,412,635 | 11/1983 | Bateman . |
| 5,190,195 | 3/1993 | Fullhart et al. . |
| 5,303,857 | 4/1994 | Hewson ................... 224/520 |
| 5,330,084 | 7/1994 | Peters . |
| 5,449,101 | 9/1995 | Van Dusen . |
| 5,529,231 | 6/1996 | Burgess . |
| 5,549,230 | 8/1996 | Palmen . |

*Primary Examiner*—Linda J. Sholl
*Attorney, Agent, or Firm*—George A. Seaby

[57] ABSTRACT

A simple, yet sturdy bicycle and ski carrier for attachment to a vehicle trailer hitch includes an inverted L-shaped post, the horizontal top arm of which receives brackets for connecting articles to the post, a frame at the bottom end of the post, and a mounting block for attachment to the rear end of a trailer hitch bar. The frame includes a rod extending between parallel sides for insertion into a transverse groove in the front of the mounting block, a sleeve near the rear end of the frame rotatably supporting cam plates, a lever for rotating the cam plates, and a linkage between the lever and the plates, for rotating the latter between a mounting block engaging position for securing the frame on the block and a release position, permitting removal of the frame from the hitch.

5 Claims, 6 Drawing Sheets

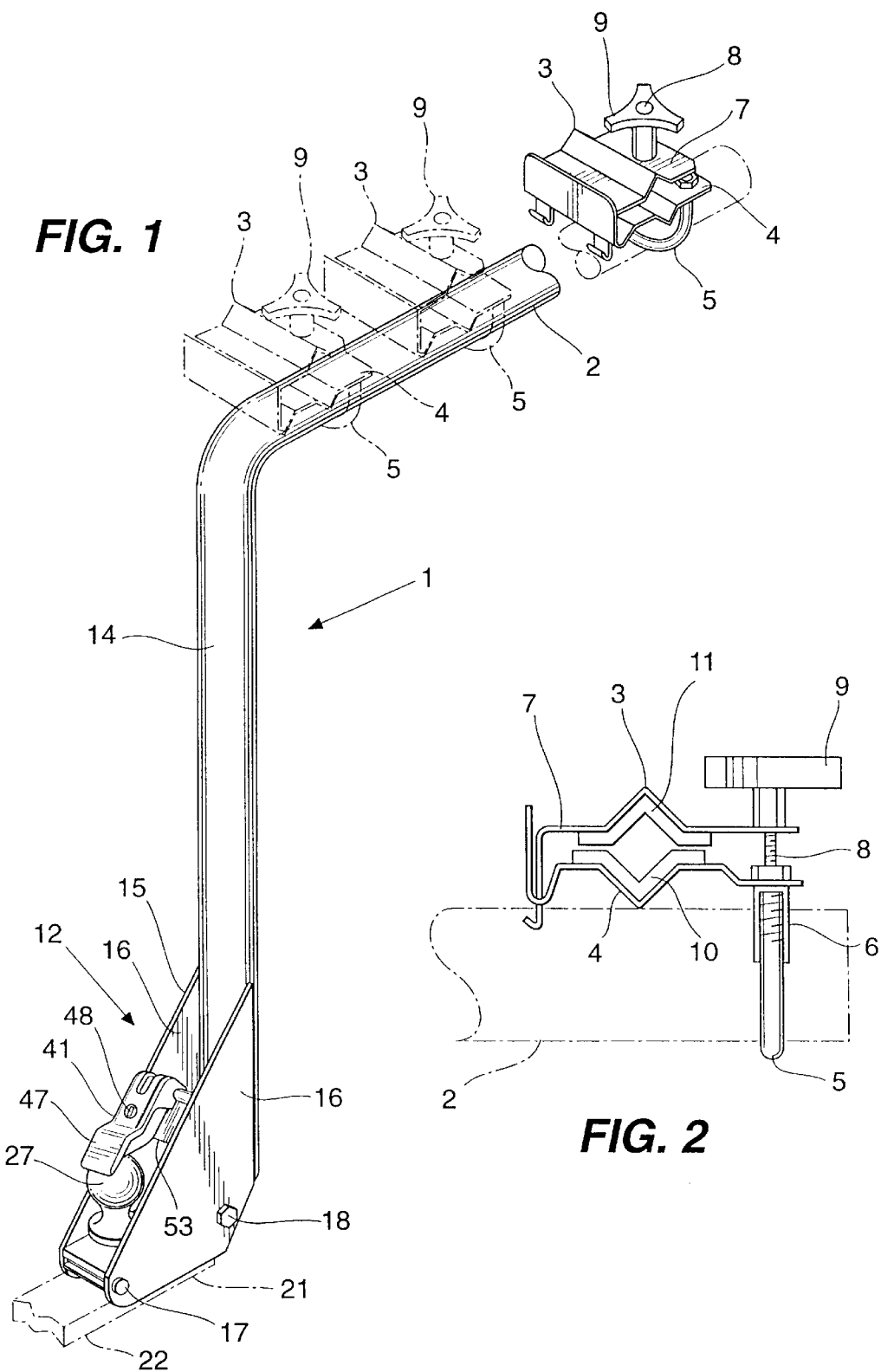

BICYCLE/SKI CARRIER

BACKGROUND OF THE INVENTION

1. Field of the Invention

This invention relates to a carrier for use on a vehicle, and in particular to a bicycle/ski carrier for use on an automobile.

2. Discussion of the Prior Art

While the device described herein is primarily intended for carrying bicycles or skis, it will be appreciated that the device can be used to carry other articles such as wheelchairs. The carrier described herein is adapted to be detachably mounted on a standard trailer hitch. Carriers of this type are well known and described in detail in the patent literature. Examples of such carriers are found, for example in U.S. Pat. No. 3,796,333, issued to Kenneth W. Goldstein on Mar. 12, 1974; U.S. Pat. No. 4,381,069, issued to Steven C. Kreck on Apr. 26, 1983; U.S. Pat. No. 4,400,129, issued to Jack Eisenberg et al on Aug. 23, 1983; U.S. Pat. No. 4,412,635, issued to Franklin B. Bateman on Nov. 1, 1983; U.S. Pat. No. 5,190,195, issued to Richard L. Fullhart et al on Mar. 2, 1993; U.S. Pat. No. 5,330,084, issued to Mark R. Peters on Jul. 19, 1994; U.S. Pat. No. 5,449,101, issued to Donn S. Van Dusen on Sep. 12, 1995; U.S. Pat. No. 5,529,231, issued to Ronald J. Burgess on Jun. 25, 1996 and U.S. Pat. No. 5,549,230, issued to Isedore D. M. H. Palmen on Aug. 27, 1996.

Carriers currently available in the marketplace and those described in the above-listed patents vary in terms of strength, complexity and ease of use. However, there is always room for improvement. Ideally, a utility carrier for use on a vehicle, e.g. a car or truck, should be strong and easily attached to or detached from the vehicle. If a carrier cannot be mounted on a trailer hitch and removed therefrom by an individual acting along, then the carrier is not user friendly. Moreover, with a view to mass production, utility carriers should be as simple as possible, with few moving parts.

GENERAL DESCRIPTION OF THE INVENTION

An object of the present invention is to meet the above-defined requirements by providing a carrier which is structurally simple, and which is still strong, safe and easy to use by an individual.

Another object of the invention is to provide a carrier, which can quickly and easily be installed or removed from a trailer hitch, and which is adapted to carry a variety of articles, including (but not limited to) bicycles and skis.

In general terms, the invention relates to a carrier for attachment to a vehicle trailer hitch comprising:

mounting block means for connection to a trailer hitch, said mounting block means, including a front end and a rear end, and a transversely extending groove in said front end;

post means having a top end for receiving brackets for securing an article to said post means, and a bottom end;

frame means on the bottom end of said post means for connection to said frame means including a pair of spaced apart side plates, rod means interconnecting a front end of said side plates, rotatable sleeve means spaced apart from said rod means and extending between a rear end of said plates, whereby the frame can be slid over the mounting block means to a position in which said side plates straddle the mounting block means, and said rod enters the groove in the front end of the mounting block means;

latch means for locking said frame means and consequently said post means on said mounting block means, said latch means including cam means on said sleeve means for rotation therewith between a release position and a mounting block means engaging position; in which said frame means s returned on said mounting block means;

lever means connected to said cam means for rotating said cam plate means between the release position and the engaging position, and latch plate means on said frame means for pivotally supporting said lever means for rotation between the cam release position and the mounting block engaging position.

BRIEF DESCRIPTION OF THE DRAWINGS

The invention is described below in greater detail with reference to the accompanying drawings, which illustrate a preferred embodiment of the invention, and wherein:

FIG. 1 is an isometric view of a carrier in accordance with the present invention installed on a trailer hitch;

FIG. 2 is a side view of a bracket used on the carrier of FIG. 1;

DESCRIPTION OF PREFERRED EMBODIMENT

Figure 3:
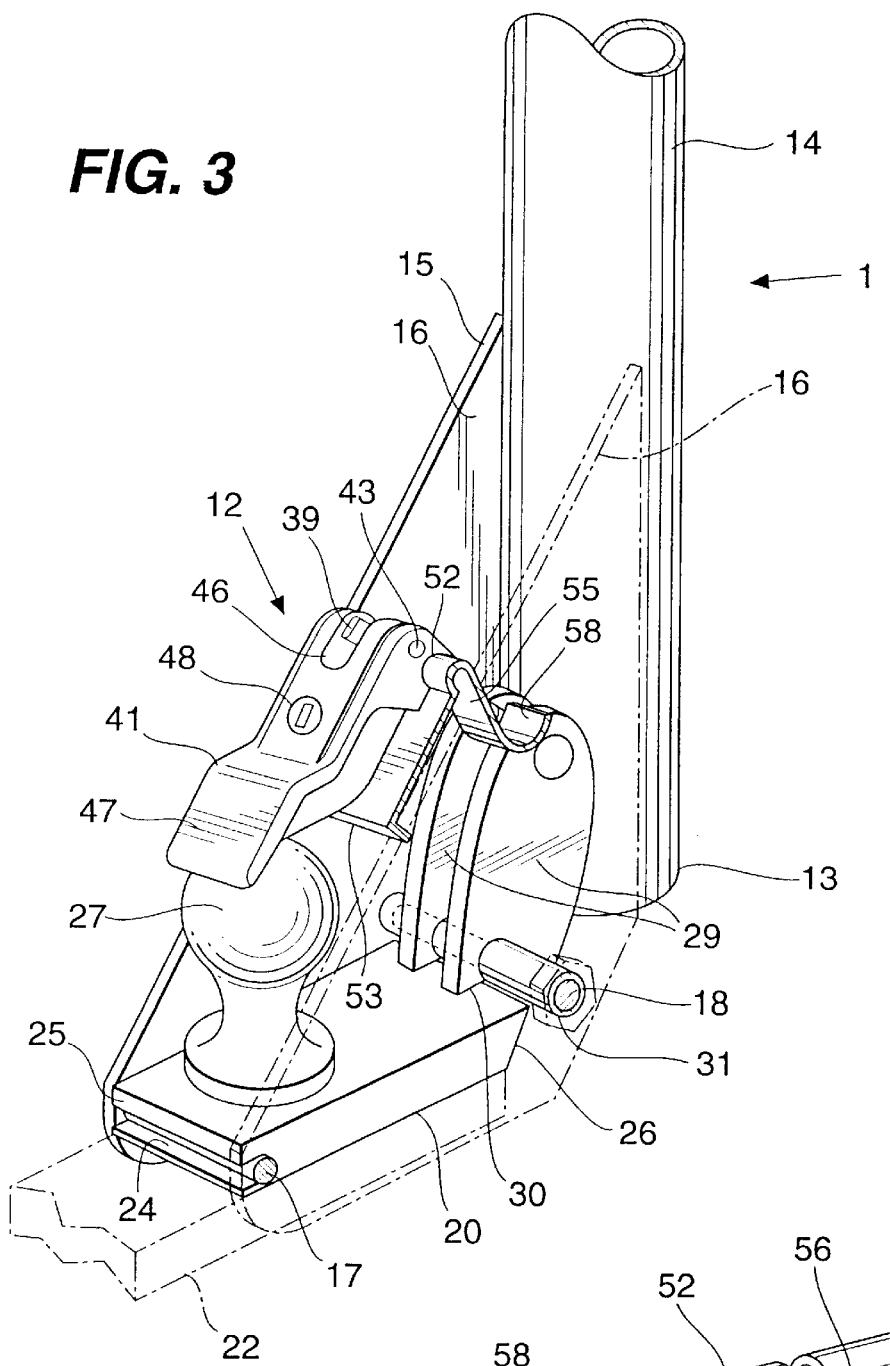
FIG. 3 is an isometric view of the bottom end of the carrier of FIG. 1 installed on a mounting block.

Referring to FIGS. 1 and 2, the carrier of the present invention includes an inverted L-shaped tubular post generally indicated at 1, the top, horizontal arm 2 of which carries a plurality of brackets 3 for connecting articles (not shown) such as bicycles or skis to the carrier. Each bracket 3 includes an L-shaped base plate 4 connected to the arm 2 by a U-bolt 5 and a cradle 6. An L-shaped top plate 7 is movably connected to the base plate 4 by a bolt 8 extending upwardly from the base plate 4 through the top plate 7, and a nut 9 for tightening the top plate 7 down against a bicycle bar or a pair of skis. Rubber pads 10 and 11 are provided on the base plate 4 and the top plate 7, respectively for protecting the finish on the article being carried.

The assembly for mounting the carrier on a trailer hitch which is generally indicated at 12 is attached to the bottom end 13 of the vertical arm 14 of the post 1. The mounting assembly 12 is defined by a frame 15 including a pair of generally trapezoidal sides 16 welded to opposite sides of the bottom end 13 of the vertical arm 14 of the post 1. The outer or front ends of the sides 16 are interconnected by a rod 17 extending between such sides 16. A bolt 18 extends between the sides 16 near the rear ends thereof. In the mounted position (FIGS. 1, 3 and 7) the bolt 18 is located in a horizontal plane slightly above the rod 17. A nut 19 (FIG. 5) holds the bolt 18 in the frame 15.

The mounting assembly 12 is intended for use with a mounting block 20 which is mounted on the trailing or outer end 21 of a trailer hitch, which in FIGS. 1, 3, 5 and 6 is merely a flat metal bar 22. The other end of the bar 22 is permanently connected to a vehicle (not shown). The mounting block 20 is a rectangular piece of steel with a transversely extending, generally U-shaped groove 24 in its outer or front end 25, and a bevelled rear end 26. The width of the block 20 is slightly less than the distance between the sides 16 of the frame 15 so that the frame 15 can freely slide over the block 20. A ball 27 is mounted on the block 20 for connecting a socket (not shown) when the hitch is used for towing a trailer or other vehicle.

Figure 5:
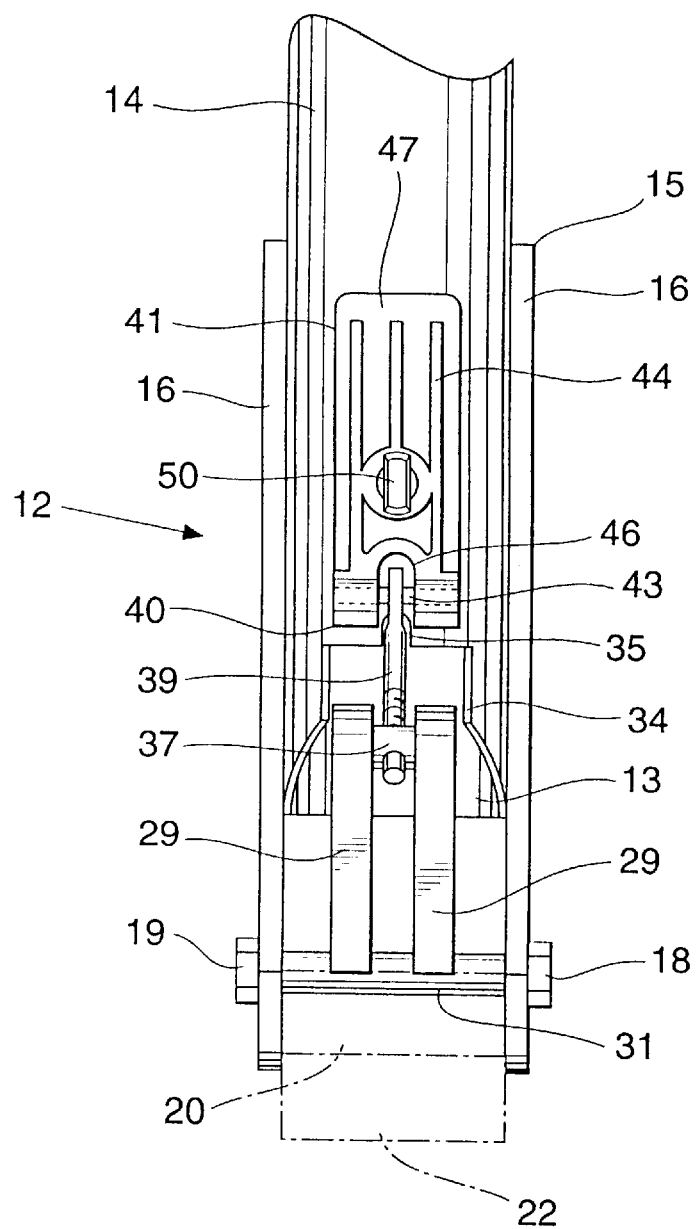
FIG. 5 is a front view of the bottom end of the carrier of FIG. 1, with parts omitted.
Figure 6:
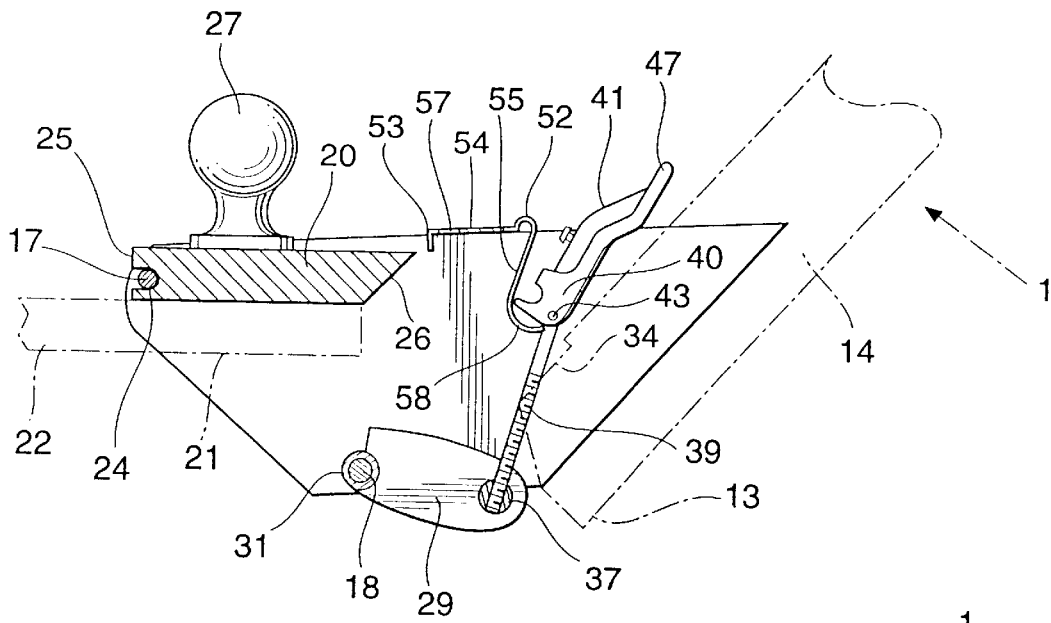
FIGS. 6 and 7 are longitudinal sectional views of the bottom end of the carrier of FIGS. 1 and 2 in a variety of positions during installation.
Figure 7:
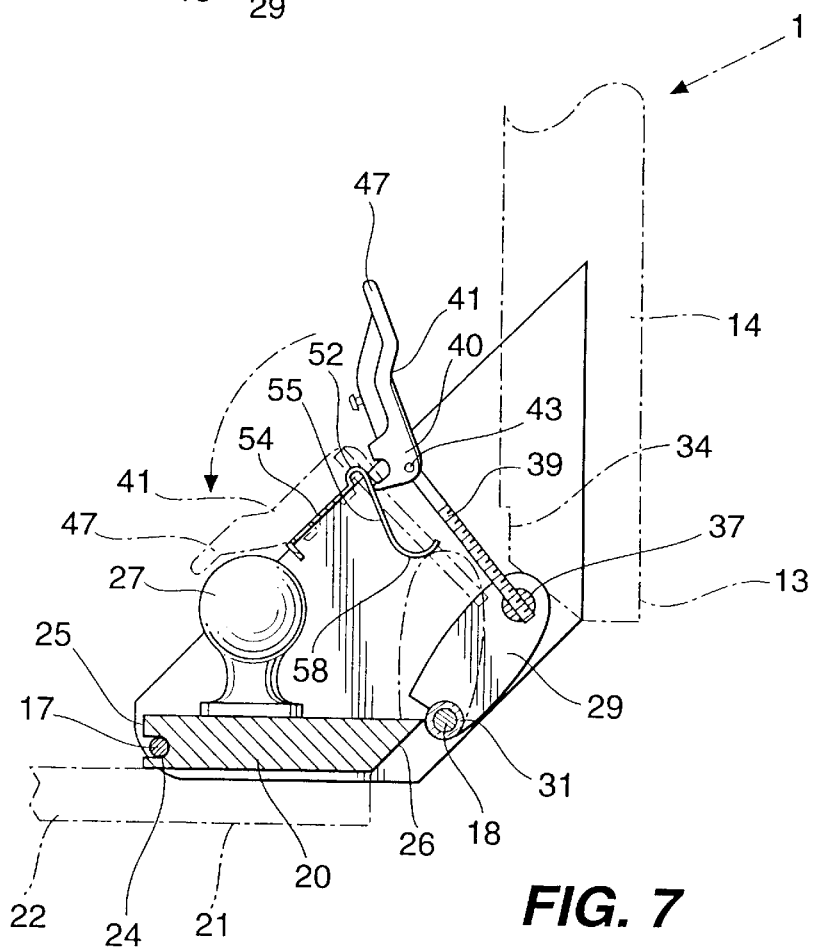

The frame 25 is releasably locked on the mounting block 20 and consequently on the trailer hitch using a latch mechanism, which includes a pair of cams 29, each of which is generally elliptical with a notch in one side of the bottom thereof defining a shoulder 30. The cams 29 are welded to a sleeve 31 which is rotatably mounted on the bolt 18 extending between the sides 16 of the frame 15. The sleeve 31 extends between the inner surfaces of the sides 16. As best shown in FIGS. 5 to 7, the front of the bottom end 13 of the post 1 is bevelled. A rectangular notch 34 with a concave groove 35 (FIG. 5) at the top center thereof is provided in the front of such bottom end 13. As described hereinafter in greater detail, the notch 34 and the groove 35 permit upward movement of the cams 29 during mounting of the carrier on a trailer hitch.

A pin 37 extends between the curved top ends 38 of the cams 29, and is freely rotatable in such top ends. One end of a headless bolt 39 is threaded into the pin 37 and extends upwardly into the bifurcated bottom end 40 of a lever 41. As best shown in FIG. 5, the bolt 39 is secured to the lever 44 by a pin 43 extending through the flattened top end of the bolt 39 and one end of the lever 41. When not in the latched position, the lever 41 can be pulled upwardly with the cams 29 and rotated to turn the bolt 39 in the pin 43, i.e. to change the length of the portion of bolt 39 above the pin 43, and consequently the distance between the cams 29 and one end of the lever 41.

Figure 4:
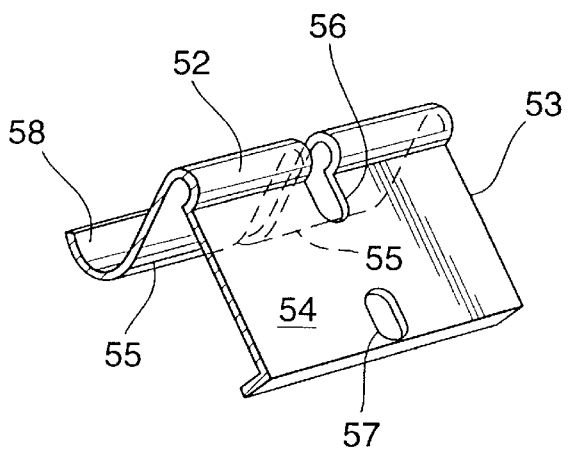
FIG. 4 is a top view of a latch plate used on the carrier of FIG. 1.

The lever 41 is defined by a generally rectangular body 44 (FIG. 5) with a U-shaped notch 46 in one end for receiving the bolt 39. The pin 43 extends transversely of such one end of the lever 41 through the notch 46 and the top end of the bolt 39. The other end of the lever 41 defines a handle 47. A lock 48 (FIGS. 1 and 3), which is optional, is provided in the center of the body, the stem 50 (FIG. 5) of the lock extending out of the bottom of the body 44. A transversely extending C-shaped groove 51 (FIGS. 6 and 7) is provided in the bottom of the lever 41 for engaging a semicylindrical corner 52 of a latch plate 53 (FIG. 4), which is welded to the sides 16 of the frame 15. The corner 52 of the latch plate 53 defines a fulcrum or pivot point for the lever 41. The latch plate 53 includes a top rectangular arm 54 of L-shaped cross section which is welded on the sides 16 of the frame 15, and a pair of generally J-shaped arms 55 integral with and perpendicular to the top arm 54. A U-shaped notch 56 is provided in the top arm 54 forming a continuation of the slot between the arms 55 for receiving the top end of the bolt 39. While a lock is optional, if a lock is provided, the top arm 54 of the plate 53 includes a slot 57 for receiving the stem 50.

Referring to FIGS. 6 and 7, before mounting the carrier on a hitch carrying the mounting block 20, the lever 41 is detached from the latch plates 53, and rests against curved bottom ends 58 of the J-shaped arms 55 of the latch plate 53. Actually, the arms 55 prevent the lever 39 failing through the frame with the cams 29.

When the carrier is being mounted on the hitch bar 22, the gap between the rod 17 and the bolt 18 defines a slot for receiving the block 20. The first step in the mounting procedure is to tilt the carrier, so that the vertical arm 14 of the post 1 defines an acute angle with respect to the horizontal mounting block 20 (the lowermost position in FIG. 6), with the frame 1 straddling the mounting block 20 and the rear end of the hitch bar 22. The rod 17 is passed over the ball 27 and the front end 25 of the block 20 into the groove 24. The post 1 is then pivoted upwardly around the longitudinal axis of the rod 17 (counterclockwise in FIG. 6) until the arm 14 of the post 1 reaches the vertical position (FIGS. 1, 2 and 7). During upward movement of the frame 15, the cams 29 and the bolt 39 pass through the notch 34 and the groove 35, respectively in the bottom end of the post 1. The carrier can then be releasably locked in position using the latch mechanism.

After the carrier has been placed on the hitch bar, i.e. the rod 17 has been inserted into the groove 24 and the carrier has been rotated to the use position, the lever 39 is pulled upwardly and the groove is aligned with the corner 51 of the latch plate 52. The lever 39 is then pivoted around the axis of the semicylindrical corner 51 from the open position (shown in solid lines in FIG. 7) to the closed position (shown in phantom outline in FIG. 7). If the lock is used, the pin 50 of the lock 48 enters the slot 57 and a key (not shown) is inserted in the top of the locked and turned to lock the lever 41 in the closed position. The latch mechanism is released by reversing this procedure, i.e. by lifting the front end of the lever 41 to unlatch the mechanism.

Figure 8:
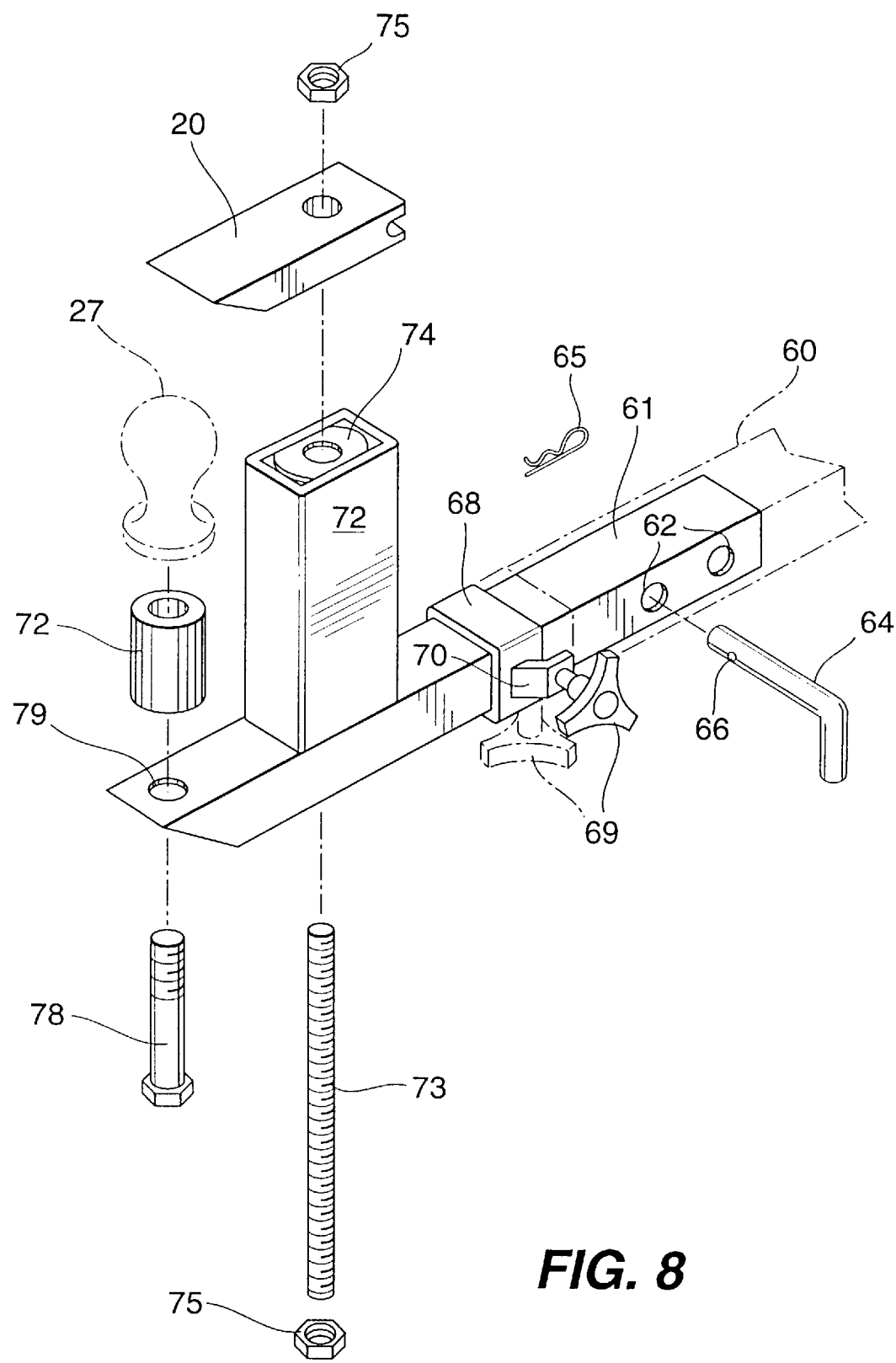
FIGS. 8 and 9 are exploded isometric views of hitch adapters for use with the carrier of FIGS. 1 to 4.

The carrier can be used with a variety of trailer hitches. As illustrated in FIG. 8, one such hitch is of the type including a square cross section socket 60 which is welded to a vehicle (not shown). A square cross section, tubular hitch bar 61 is slidable in the trailing, free end of the socket 60. Aligned holes 62 are provided in the socket 60 and the bar 61 for receiving an L-shaped locking pin 64. The pin 64 is retained in the holes 62 by a cotter pin 65, which is inserted into a hole 66 in the pin 64 after the latter has been passed through the aligned holes 62. A sleeve 68 on the bar 61 limits movement of the bar 61 into the socket 60. When the bar 61 is mounted in the socket 60, the trailing end of the socket 60 is engaged by bolts 69 extending through generally L-shaped arms 70 (one shown) on the sleeve 68.

The mounting block 20 is attached to the top end of a tubular post 72. The post 72 is mounted on the bar 61 using a threaded rod 73, a washer 74 welded in the top end of the post 72, and nuts 75 on each end of the rod 73. The ball 27 is mounted on a tubular extension 77 at the bevelled, trailing end of the bar 61 by means of a bolt 78 extending upwardly through a hole 79 in the bar into a threaded bore (not shown) in the bottom of the ball 27.

Figure 9:
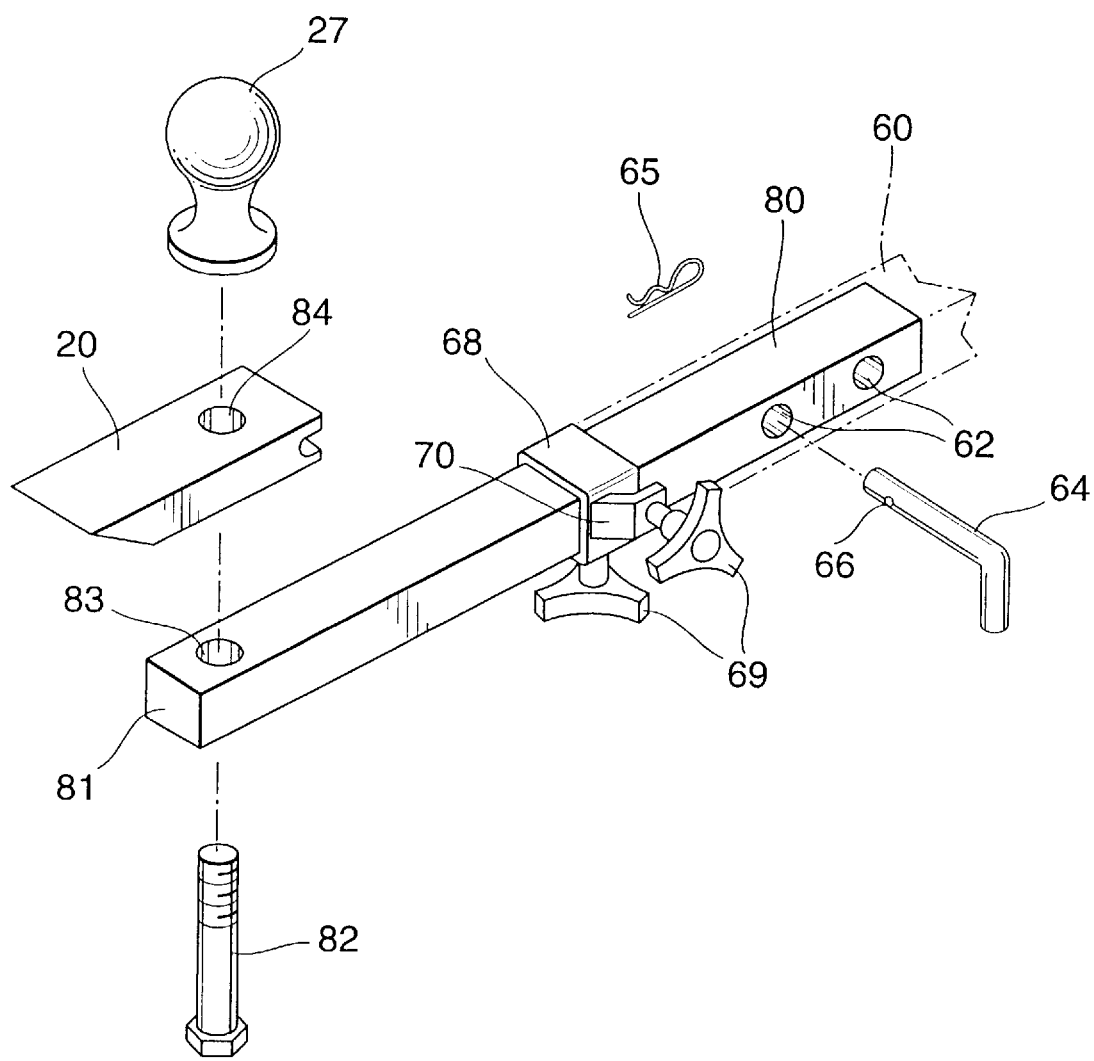

Another hitch for use with the carrier of the present invention is illustrated in FIG. 9. The hitch of FIG. 9 includes a socket 60 for receiving a solid, square cross section hitch bar 80. The socket 60 and the hitch bar 80 are interconnected in the same manner as the hitch of FIG. 8, and accordingly wherever possible the same reference numerals have been used to identify the same or similar elements.

The mounting block 20 and the ball 27 are attached to the square trailing end 81 of the bar 80 using a bolt 82 which extends upwardly through aligned holes 83 and 84 in the bar 80 and the block 20 into the threaded bore in the ball 27.

The carrier described above is structurally simple and easy to install and detach from a tailer hitch.

I claim:

1. A carrier for attachment to a vehicle trailer hitch comprising:

mounting block means for connection to a trailer hitch, said mounting block means, including a front end and a rear end, and a transversely extending groove in said front end;

post means having a top end for receiving brackets for securing an article to said post means, and a bottom end;

frame means on the bottom end of said post means for connection to said mounting block means including a pair of spaced apart side plates, rod means interconnecting a front end of said side plates, rotatable sleeve means spaced apart from said rod means and extending between a rear end of said plates, whereby the frame can be slid over the mounting block means to a position in which said side plates straddle the mounting block means, and said rod enters the groove in the front end of the mounting block means;

latch means for locking said frame means and consequently said post means on said mounting block means, said latch means including:

cam means on said sleeve means for rotation therewith between a release position and a mounting block means engaging position in which said frame means is retained on said mounting block means;

lever means connected to said cam means for rotating said cam plate means between the release position and the engaging position, and latch plate means on said frame means for pivotally supporting said lever means for rotation between the cam release position and the mounting block engaging position.

2. The carrier of claim 1, wherein said cam means includes a pair of cam plates having first ends connected to said sleeve means, a shoulder on each said first end for engaging the rear end of said mounting block means, and second ends connected to said lever means.

3. The carrier of claim 2, including pin means extending between and rotatable in said second ends of the cam plates; and bolt means having a first end connected to said pin means and a second end pivotally connected to one end of said lever means.

4. The carrier of claim 3, wherein said latch plate means includes a top arm mounted on the side plates of said frame means; a pair of spaced apart J-shaped arms extending downwardly from said top plate between the side plates of said frame means for supporting said lever means in an unlatched position; and a fulcrum between said top arm and said J-shaped arms for pivotally supporting said lever means during rotation between the latched and unlatched positions.

5. The carrier of claim 4, including notch means in the bottom end of said post means between the side plates of said frame means permitting passage of said cam plates and said bolt means through the bottom end of said post means during rotation of the frame means and post means when mounting the carrier on said mounting block means.

* * * * *